US006700118B2

(12) United States Patent
Yefchak et al.

(10) Patent No.: US 6,700,118 B2
(45) Date of Patent: Mar. 2, 2004

(54) THERMAL DRIFT COMPENSATION TO MASS CALIBRATION IN TIME-OF-FLIGHT MASS SPECTROMETRY

(75) Inventors: George Yefchak, Santa Clara, CA (US); Carl Myerholtz, Cupertino, CA (US); Gangqiang Li, Palo Alto, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 212 days.

(21) Appl. No.: 09/930,835

(22) Filed: Aug. 15, 2001

(65) Prior Publication Data

US 2003/0034448 A1 Feb. 20, 2003

(51) Int. Cl.[7] ........................... B01D 59/44; H01J 49/00

(52) U.S. Cl. ....................................... 250/287; 250/282

(58) Field of Search ................................. 250/282, 287

(56) References Cited

U.S. PATENT DOCUMENTS

| | | | | |
|---|---|---|---|---|
| 4,490,610 A | | 12/1984 | Ulbricht, Jr. | |
| 5,463,220 A | | 10/1995 | Young et al. | |
| 5,614,711 A | | 3/1997 | Li et al. | |
| 6,049,077 A | | 4/2000 | Franzen | |
| 6,456,095 B1 | * | 9/2002 | Sorita et al. | 324/703 |
| 6,465,777 B1 | * | 10/2002 | Rache | 250/287 |

* cited by examiner

*Primary Examiner*—Bruce Anderson

(57) ABSTRACT

Adjustment systems, methods, computerized methods and computer readable-mediums that can be used in time-of-flight mass spectrometry (TOFMS) to account for thermal drift or mechanical strain are provided.

19 Claims, 2 Drawing Sheets

THERMAL DRIFT COMPENSATION TO MASS CALIBRATION IN TIME-OF-FLIGHT MASS SPECTROMETRY

FIELD OF THE INVENTION

The invention relates to adjustment systems and computer readable-mediums that can be used in time-of-flight mass spectrometry (TOFMS) to account for thermal drift. Methods of adjusting time-of-flight mass spectra to account for thermal drift or mechanical strain are also provided.

BACKGROUND

In time-of-flight mass spectrometry (TOFMS), one calculates the mass-to-charge ratio (m/z) of ions by measuring their velocities. Typically the ion charge is one (z=1), and thus we speak of ion masses instead of mass-to-charge ratios. Ions of varying masses are separated by their differing velocities as they travel along a field-free path of known length. Similarly, "mass scale" is typically used to refer to the assignment of masses to flight times and "mass spectrum" refers to a list of ion abundances and corresponding ion masses.

Time-of-flight mass spectrometers are described, for example, in U.S. Pat. Nos. 4,490,610; 5,463,220; and 5,614,711. Ion abundances for each mass are measured as ions strike a detector at the end of the path. The signal acquired from the detector shows these ion abundances as a function of travel time.

The following mathematical relationship can be used to convert travel time (t) to ion mass (m):

$$t=c+k\sqrt{m} \quad \text{Equation (1)}$$

where k is a constant related to the length of the flight path and the ion energy and c is a small delay time which may be introduced by the signal cable and/or detection electronics.

For very high accuracy, however, it is desirable to model the ion motion with a more complex expression having more than two parameters. In general, mass is related to time by a model such as $$m=f(a_0,a_1, \ldots a_n,t_0,t) \quad \text{Equation (2)}$$

Here $a_0, \ldots a_n$ are coefficients and $t_0$ is a time offset. Thus, mass is a function of a set of parameters (e.g., $a_0$, $a_1$, etc.), optionally including a time offset parameter ($t_0$) and flight time t.

Typically, an equation of the following form is used:

$$\sqrt{m} = a_0 + a_1 t + a_2 t^2 + \ldots a_n t^n \text{ or } \sqrt{m} = a_0 + \sum_{i=1}^{n} a_i t^i \quad \text{Equation (3)}$$

To calculate ion mass, the value of the calibration parameters $a_0, a_1, \ldots a_n$ must be determined. Typically, this is done by measuring times ti for several known masses $m_i$ and fitting the model to this data. The higher order terms $a_2 \ldots a_n$ are small corrections which are often neglected if high accuracy is not required. Mass accuracies of 10 parts-per-million (ppm) or better are often necessary, however, for analysis of peptides and other compounds of biological interest.

Generally, a large number of influences affect the stability of the mass scale calibration curve: inconstancy of the high voltages for acceleration of the ions, variable spacing of the acceleration diaphragms in the ion source caused by the mounting of sample supports introduced into the vacuum, variable initial energies of the ions due to the ionization process, and not least, thermal changes in the length of the flight path. U.S. Pat. No. 6,049,077 describes the use of special materials to construct time-of-flight mass spectrometers in order to compensate for thermal expansion.

During operation, the temperature of a mass spectrometer can vary by 10 degrees Celsius or more. In particular, the power source (e.g., electronics) and other factors can lead to increased temperatures which, in turn, can affect the resulting mass calibration. In order to keep the mass spectra as accurate as possible, the addition of internal references is often used. However, this solution is inconvenient, as it requires the addition of mass-similar references for each sample. Furthermore, use of special, temperature-controlling materials is costly and has no opportunity for feedback.

Thus, there remains a need for methods, devices and systems to compensate for thermal drift and/or mechanical strain in time-of-flight mass spectrometry.

SUMMARY OF THE INVENTION

In one aspect, the invention includes a method for adjusting a mass spectrum for a sample to account for temperature changes or mechanical strain in a time-of-flight mass spectrometer. Typically, the method comprises the steps of (a) obtaining a temperature or strain measurement from a time-of-flight mass spectrometer; (b) selecting calibration parameters that describe the mass spectrum at the temperature or strain measurement obtained in step (a); and (c) using a mathematical model comprising the calibration parameters selected in step (b) to provide an adjusted mass spectrum for a sample ion to account for temperature changes or mechanical strain.

In another aspect, an adjustment system for adjusting a mass spectrum obtained from a time-of-flight mass spectrometer to account for thermal drift or strain is provided. An adjustment system for adjusting a mass spectrum obtained from a time-of-flight mass spectrometer to account for thermal drift or strain can comprise a computing means (or one or more computer readable mediums) in operative communication with at least one temperature or mechanical strain sensor to obtain temperature or strain readings from at least one position in the time-of-flight mass spectrometer. Preferably, the computing means is capable of adjusting mass scale based on the readings using a mathematical model comprising calibration parameters and the calibration parameters describe the adjusted mass scale.

In another aspect, the invention includes an article of manufacture comprising a computer usable medium having computer readable program medium embodied therein for causing calibration parameters of Equation (3) to be adjusted to account for thermal drift or mechanical strain in order to obtain mass spectra data.

In yet another aspect, the invention includes a computerized method for accounting for thermal drift or mechanical strain in a time-of-flight mass spectrometer, comprising: (a) maintaining a database of calibration parameters for use in determining mass spectra at a particular temperature or strain measurement; (b) selecting the appropriate calibration parameters from the database to determine a mass spectrum of a sample subject to time-of-flight mass spectrometry and during which mass spectrometry the temperature or strain is monitored; and (c) controlling a user interface to display or print the mass spectrum which has adjusted to account for thermal drift or mechanical strain.

In another aspect, the invention includes a computer-readable medium having computer-executable instructions for performing a method comprising: (a) maintaining a database of calibration parameters for use in determining mass spectra at a particular temperature or strain measurement; (b) selecting the appropriate calibration parameters from the database to determine a mass spectrum of a sample subject to time-of-flight mass spectrometry and during which mass spectrometry the temperature or strain is monitored; and (c) controlling a user interface to display or print the mass spectrum which has been adjusted to account for thermal drift or mechanical strain.

In any of the methods or systems (e.g., methods, adjustment systems, articles of manufacture, computerized methods, computer-readable mediums) described herein, the temperature (or strain) measurement is preferably obtained using at least one sensor in the time-of-flight mass spectrometer, for example, at least one sensor in the flight chamber, in the power supply and/or in the electronic components which produce the ion accelerating voltage pulse. Furthermore, in certain embodiments, the calibration parameters are determined from first principles or, alternatively, the calibration parameters are determined empirically, for example by solving the calibration parameters of Equation (3) using a known mass sample at a range of temperatures or mechanical strains. When determined empirically, the calibration parameters are determined for a known mass sample at various temperature intervals, for example for at least every degree between 15 and 65 degrees Celsius, and preferably for at least every half of degree between 20 and 30 degrees Celsius.

These and other embodiments of the subject invention will readily occur to those of skill in the art in light of the disclosure herein.

DESCRIPTION OF THE INVENTION

Figure 1:
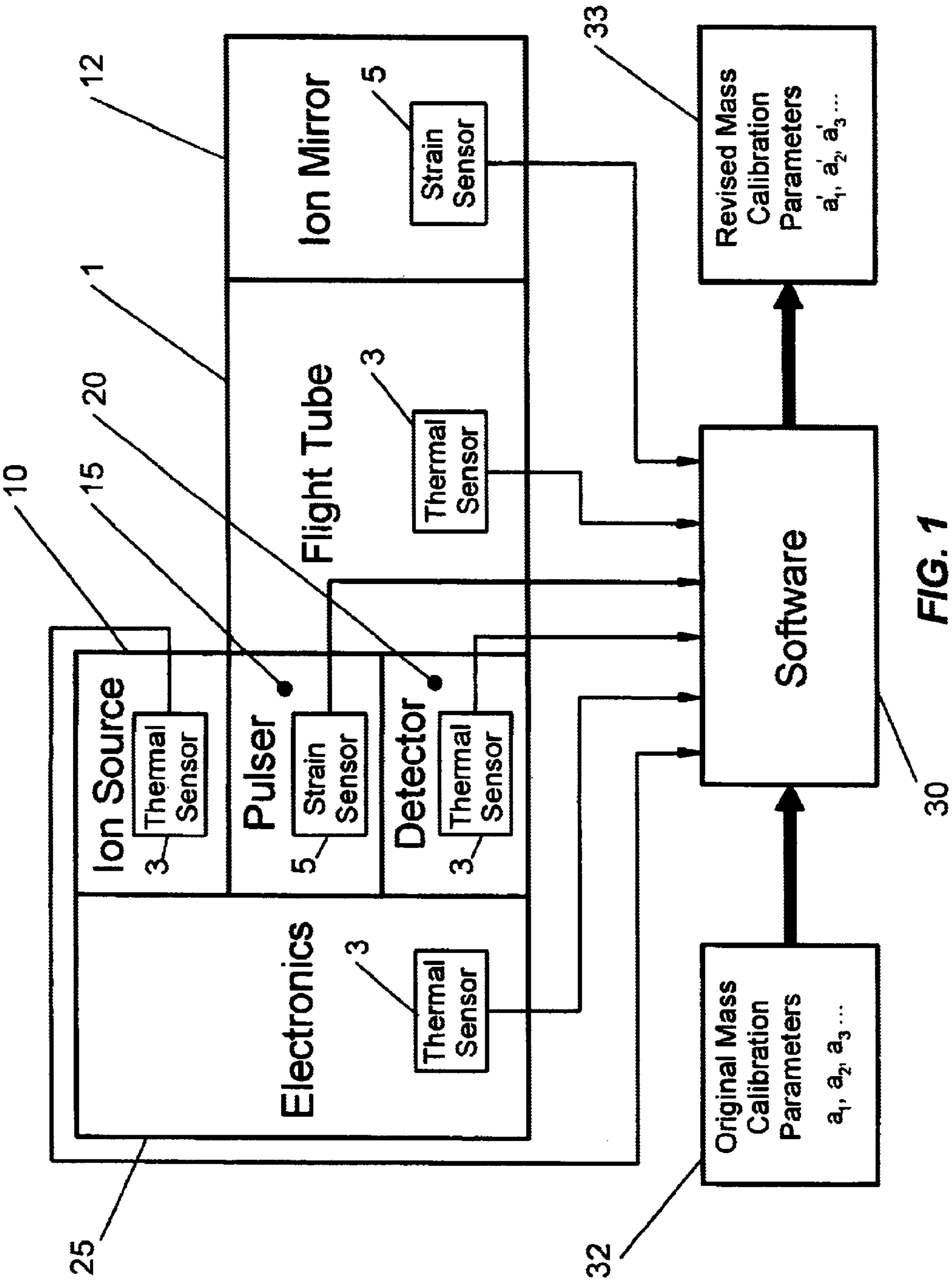
FIG. 1 is a schematic depicting one embodiment of the system described herein. Thermal and strain sensors are depicted at various locations in the TOFMS instrument. A software program can use data from these sensors (depicted as arrows) to modify calibration parameters and avoid drift in mass assignment.
Figure 2:
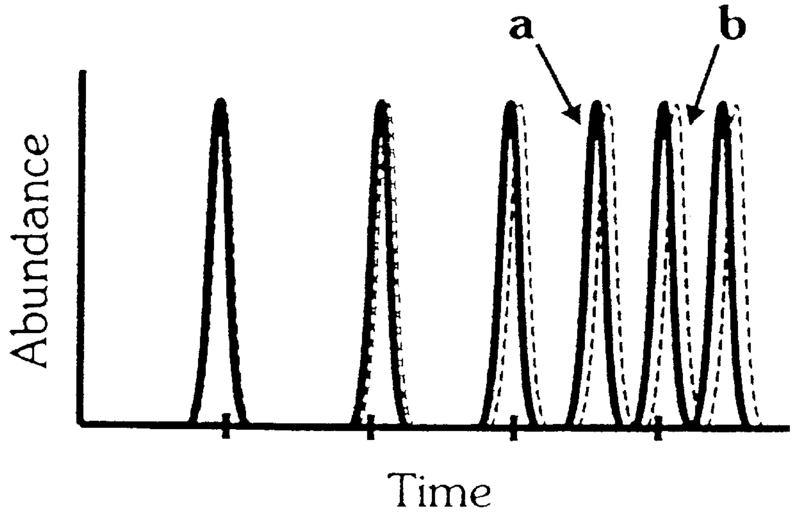
FIG. 2 is graph depicting hypothetical mass spectrum before (solid line) and after (dotted line) flight chamber expansion due to increased temperature.

Before the invention is described in detail, it is to be understood that this invention is not limited to the particular component parts of the devices described or process steps of the methods described as such devices and methods may vary. It is also to be understood that the terminology used herein is for purposes of describing particular embodiments only, and is not intended to be limiting. It must be noted that, as used in the specification and the appended claims, the singular forms "a," "an" and "the" include plural referents unless the context clearly dictates otherwise. Thus, for example, reference to "a detection or sensing means" includes two or more such detection or sensing means, and the like.

There are methods of controlling thermal drift in time of flight mass spectrometers, for example by altering the material out of which the flight chamber is constructed. However, such methods have the following disadvantages: high construction cost, inconsistent results and no opportunity for feedback.

The present invention provides apparatus (e.g, adjustment systems and computer-readable mediums) and methods (e.g., computerized methods) to adjust mass spectra obtained from time-of-flight mass spectrometers to account for thermal drift and mechanical strain perturbations. The methods of the present invention provide, for example, the following advantages: (i) a model for determining calibration parameters, and (ii) the ability to account for thermal drift and/or mechanical strain perturbations when obtaining mass spectral data.

In the practice of the present invention, data obtained by the detection means (e.g., temperature and/or strain sensors) in one or more selected regions of the time-of-flight mass spectrometer are used to create suitable models for determining calibration parameters and methods to predict and adjust mass spectra based on thermal drift. Using the adjustments systems (including, for example the adjusted calibration parameters) of the present invention, the mass spectrum based on calculations using these calibration parameters are adjusted to account for temperature and/or mechanical strain, and a more accurate mass calibration is obtained.

Following here is a general description of the calibration parameter determination and adjustment method of the present invention. Because the adjustment model of the present invention includes adjustment to calibration parameters of Equation (1) or, preferably, Equation (3), it is first necessary to determine how to adjust these parameters. This may be accomplished empirically or by derivation from first principles. Thus, in certain embodiments, the model is obtained empirically, for example by acquiring mass spectral (of a known mass sample) at a variety of temperatures. In other embodiments, the model is obtained from first principals.

For example, when determining calibration parameters empirically, a series of mass spectra data and temperature readings are collected using a sample with known masses at varying temperatures. In certain embodiments, the temperature readings are around ambient (e.g., in the range of about 15° C. to 35° C., or any value therebetween), for example, when readings are collected from the flight chamber. In other embodiments, the temperature readings may be higher or lower than ambient. For example, temperature readings collected from the power source may be in the range of about 40° C. to about 65° C. or even higher). Furthermore, in any aspects of the invention, readings can be collected while the temperature is altered by an operator, for example in uniform or non-uniform increments. Alternatively, readings can be collected without adjusting temperature, for example, as the instrument follows a normal warm-up procedure. It will also be apparent that, based on any of the readings obtained, additional data points can generated by extrapolating and/or interpolating from the actual readings.

Furthermore, the data is also collected using detection means (e.g., temperature and/or strain sensors) in one or more regions of the apparatus. A "detection means" or "sensing means" is intended to include any means, structure or configuration that allows the interrogation of a time-of-flight mass spectrometer or related equipment (e.g., power source or other electronics) using detectors and/or sensors that are well known in the art. Thus, also included are any apertures, elongated apertures or grooves that allow the detection means to be interfaced with the time-of-flight mass spectrometer to detect temperature, mechanical strain or the like in the time-of-flight mass spectrometer or related equipment. The measured signal can be obtained using any suitable sensing methodology including, for example, methods which rely on direct contact of a sensing apparatus with a system. In preferred embodiments of the invention, a plurality of temperature and/or mechanical strain sensors are placed in the flight chamber and/or in the electronic control regions of the time-of-flight mass spectrometer. One of skill in the art can readily determine, for example, empirically, where such sensors can be positioned in order to provide the most accurate model for adjusting the calibration parameters of Equations (1), (2) and/or (3), for example, one or more positions in the flight chamber, various sub assemblies within the flight chamber, power supplies and/or in the electronic components (e.g., components which produce the voltage pulse that accelerates ions into the flight path) of the time-of-flight mass spectrometer. The sensing apparatus used with any of the above-noted methods can employ any suitable sensing element to provide the information, including but not limited to, physical, chemical, electromagnetic, or like elements.

The mass spectral data obtained using known mass ions at various known temperatures are then examined for variation from the known, accurate mass spectra. Based on the variation, calibration parameters from the algorithms shown in Equation (1) or Equation (3) are revised so that this algorithm provides the proper mass in view of the actual temperature. The mathematical transformation is based on the established relationship between the adjusted calibration parameters and empirically determined mass spectra to be performed in order to arrive at an adjusted mass calibration (e.g., using Equation (3) with the adjusted calibration parameters $a_0$, $a_1$, etc.). Thus, a calibration step is used herein to relate, for example, a temperature change in the time-of-flight mass spectrometer with the proper calibration parameters to provide an accurate mass assignment.

Preferably, an adjustment system such as a computing means (providing the algorithm and calibration parameters correlating to specific temperatures) is provided, for example, in the form of a computer program or microprocessor operably linked to the time-of-flight mass spectrometer and sensors therein. An "adjustment system," as used herein, refers to a system useful for calibrating time-of-flight mass spectrometry measurements to account for thermal drift or mechanical strain on the flight path chamber. Such a system typically includes, but is not limited to, one or more temperature sensors, one or more strain measurement sensors and at least one processing means (e.g., computer program, microprocessor, etc.) in operative communication with the temperature and/or strain measurement sensors. In this way, a mass spectrum can be adjusted to account for thermal drift.

Additional components may also be present in the methods and systems described herein, including, but not limited to, graphics display, user interfaces (for example, LCD displays; tactile or mechanical signals (e.g., vibrations, alarms, buttons, etc.) and auditory signals (e.g., alarm or speaker)). The term "microprocessor" refers to any type of device that functions as a microcontroller and also includes any type of programmable logic, buttons, wireless connections and the like.

Therefore, the present invention includes, but is not limited to, methods, computerized methods, devices, algorithms, computer programs/computer readable mediums, equations, statistical methods, processes, and microprocessors, for use singly or in combination for adjusting a mass spectrum based on thermal drift and/or mechanical strain as described herein by the present invention. For any given sample, the temperature sensors communicate temperature to the microprocessor. In turn, the microprocessor determines the predicted error in flight time based on the amount of thermal drift, the value of calibration parameters of Equation (3) are adjusted accordingly and the adjusted values used to calculate the actual mass. It is to be understood that the present invention is not limited as to the type of computer on which it runs. The computer typically includes a keyboard, a display device such as a monitor, and a pointing device such as a mouse. The computer also typically comprises a random access memory (RAM), a read only memory (ROM), a central processing unit (CPU), and a storage device such as hard disk drive or a floppy disk drive.

Thus, once a model suitable to the position of the sensors and type of apparatus is generated, the model is preferably programmed into a processor means (e.g., computer program, microprocessor, etc.) which is operably connected to the sensor(s). The processor means is capable of adjusting the mass spectra to account for changes in temperature. The processor can include, but is not limited to, any computer readable medium for causing a temperature and/or mechanical strain drift to be included in determining the output mass spectrum; program code for storing (e.g., in an array or database) temperature, strain and/or mass spectra values; program code for storing (e.g., in an array or database) calibration parameters for any given temperature or strain; computer readable medium for causing the computer to adjust the output mass spectra in view of the temperature and/or mechanical strain information. As used herein, the term "computer readable medium" includes any kind of computer memory such as floppy disks, conventional hard disks, CD-ROMS, Flash ROMS, non-volatile ROM, and RAM.

The following components of the adjustment system are preferably in operative combination/communication:

(A) a sensing device for monitoring temperature and/or mechanical strain at one or more positions in a time-of-flight mass spectrometer (and in operative contact with the time-of-flight mass spectrometer), wherein the temperature and/or mechanical strain is specifically related to the mass spectrum of a sample, and (B) one or more computing means (e.g., microprocessors) capable of being in operative communication with the sensing device. The computing means is capable of adjusting the calibration parameters used to determine the mass spectrum (e.g., Equation (1)). Furthermore, the computing means (e.g., microprocessor(s)) is capable of adjusting the mass spectrum in light of the measured signal.

Thus, the compositions and methods described herein can also include computer-readable mediums with computer-executable instructions for adjusting a mass scale to account for thermal drift. A computer-readable medium can include, for example, a database that contains calibration parameters that correspond to particular temperatures (or strain measurements). For any given sample undergoing TOFMS, the temperature or strain in the time-of-flight mass spectrometer is monitored and the appropriate calibration parameters are selected from the database to provide an accurate mass calibration. In addition, the computer-readable medium preferably is linked to or controls a user interface (e.g,. printer or graphic display unit) such that the adjusted mass spectra can be viewed by the user.

One exemplary embodiment is shown in FIG. 1. Thermal sensors 3 are depicted in the electronics 25, ion source 10, detector 20 and flight tube 1 of a TOFMS instrument. Also depicting in this exemplary embodiment are strains sensors in the pulser 15 and ion mirror 12 regions of the instrument. Data (arrows) is collected from these sensors and is communicated to a computing means 30, for example, software. The software 30 revises original mass calibration parameters 32 based on this data in order to avoid drift in mass assignment.

The above general methods and devices can, of course, be used with any suitable time-of-flight mass spectrometer and a wide variety of sensing mechanisms in a wide variety of locations of the time-of-flight mass spectrometer. The determination of particularly suitable locations is within the skill of the ordinarily skilled artisan when directed by the present disclosure.

EXAMPLES

Example 1

Adjustment of Calibration Parameters to Account for Thermal Drift

Temperature sensors are placed in various positions in a time-of-flight mass spectrometer at 25° C. with a flight path length of 1 m and an acceleration of energy of 3 keV and linked to a microprocessor unit. Using Equation (1), the calibration parameter k is determined to be 1.31430. The constant c is assumed to be 0 for purposes of this Example. Therefore, assuming constant temperature, a 1000-Da ion sample has a flight time of $$1.31430\sqrt{1000}=41.56195\ \mu s$$

The linear thermal expansion coefficient for steel is approximately $10^{-5}$/° C. Therefore, if the flight path temperature rises 3 degrees to 28° C., the flight path length will increase by approximately 30 ppm (3° C.×$10^{-5}$/° C.) and the flight time is calculated to be 41.56320 μs. Without adjusting k, an unknown sample containing 1000-Da ions analyzed at 28° C., the time-of-flight mass spectrometer reports the flight time of 41.56320 and solving Equation 1 for m and using the existing 25° C. value for k would yield an incorrect mass value 1000.06 Da, with a relative error of 60 ppm, of approximately twice the flight-time error (due to the squared relationship between time and mass). Even this small error is too large for some applications in protein analysis or other biological studies. Therefore, at a measured temperature of 28° C., k is adjusted accordingly.

Modifications of the procedure and device described above, and the methods of using them in keeping with this invention will be apparent to those having skill in this field. These variations are intended to be within the scope of the claims that follow.

What is claimed is:

1. A method for adjusting a mass spectrum for a sample ion to account for temperature changes or mechanical strain in a time-of-flight mass spectrometer, said method comprising:

(a) obtaining a temperature or strain measurement from a time-of-flight mass spectrometer;

(b) selecting calibration parameters that correspond to the temperature or strain measurement obtained in step (a); and (b) using a mathematical model comprising the calibration parameters selected in step (b) to provide an adjusted mass spectrum for a sample ion to account for temperature changes or mechanical strain.

2. The method of claim 1, wherein the temperature or strain measurement is obtained using at least one sensor in the time-of-flight mass spectrometer.

3. The method of claim 2, wherein the measurement is a temperature measurement and the at least one sensor is located in the flight chamber, the power supply or the electronic components which produce the ion accelerating voltage pulse.

4. The method of claim 2, wherein the measurement is a mechanical strain measurement and the at least one sensor is located in the flight chamber.

5. The method of claim 1, wherein the adjusted calibration parameters are determined empirically.

6. The method of claim 5, wherein the empirical determination comprises solving Equation (3) for calibration parameters using a known mass ion sample at a range of temperatures or mechanical strains, wherein Equation (3) is $$\sqrt{m}=a_0+a_1t+a_2t^2+\ldots a_nt^n$$

and wherein, m is mass; a is a co-efficient; n is any positive number and t is time.

7. The method of claim 1, wherein the calibration parameters are determined for at least every degree between 15 and 65 degrees Celsius.

8. The method of claim 1, wherein the calibration parameters are determined for at least every half of degree between 20 and 30 degrees Celsius.

9. An adjustment system for adjusting a mass spectrum obtained from a time-of-flight mass spectrometer to account for thermal drift or strain, said system comprising, a computing means in operative communication with at least one temperature or mechanical strain sensor to obtain temperature or strain readings from at least one position in the time-of-flight mass spectrometer, said computing means capable of adjusting mass scale based on the readings using a mathematical model comprising calibration parameters, wherein said calibration parameters describe the adjusted mass scale.

10. The adjustment system of claim 9, wherein the sensor is a temperature sensor.

11. The adjustment system of claim 10, wherein the measurement is a temperature measurement and the sensor is located in the flight chamber, the power supply or the electronic components which produce the ion accelerating voltage.

12. The adjustment system of claim 10, wherein the measurement is a mechanical strain measurement and the at least one sensor is located in the flight chamber.

13. The adjustment system of claim 10, wherein the adjusted calibration parameters are determined empirically.

14. The adjustment system of claim 13, wherein the empirical determination comprises solving the equation for calibration parameters using a known mass ion sample at a range of temperatures or mechanical strains.

15. The adjustment system of claim 9, wherein the calibration parameters are determined for at least every degree between 15 and 65 degrees Celsius.

16. A computerized method for accounting for thermal drift or mechanical strain in a time-of-flight mass spectrometer, comprising:

maintaining a database of calibration parameters for use in determining mass spectra at a particular temperature or strain measurement;

selecting the appropriate calibration parameters from the database to determine a mass scale of spectral data of a sample subject to time-of-flight mass spectrometry; and controlling a user interface to display or print the mass spectra in which the mass scale has been adjusted to account for thermal drift or mechanical strain.

17. The computerized method of claim 16, wherein the mass scale of spectral data is determined by solving Equation (3) using the appropriate calibration parameters.

18. The computerized method of claim 16, wherein the temperature or strain is monitored in at least one region of the time-of-flight mass spectrometer.

19. A computer-readable medium having computer-executable instructions for performing a method comprising:

maintaining a database of calibration parameters for use in determining mass scale at a particular temperature or strain measurement;

selecting the appropriate calibration parameters from the database to determine a mass scale of spectral data of a sample subject to time-of-flight mass spectrometry; and controlling a user interface to display or print the mass spectra in which the mass scale has been adjusted to account for thermal drift or mechanical strain.

* * * * *